(12) United States Patent
Liao et al.

(10) Patent No.: US 11,165,193 B2
(45) Date of Patent: Nov. 2, 2021

(54) ELECTRICAL CONNECTION STRUCTURE AND WEARABLE DEVICE

(71) Applicant: HUAWEI TECHNOLOGIES CO., LTD., Guangdong (CN)

(72) Inventors: YiHsiang Liao, Shenzhen (CN); Hongwei Du, Xi'an (CN); Yanlei Ma, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/498,732

(22) PCT Filed: Jun. 26, 2017

(86) PCT No.: PCT/CN2017/090093
§ 371 (c)(1),
(2) Date: Sep. 27, 2019

(87) PCT Pub. No.: WO2018/176662
PCT Pub. Date: Oct. 4, 2018

(65) Prior Publication Data
US 2020/0161800 A1 May 21, 2020

(30) Foreign Application Priority Data

Mar. 31, 2017 (CN) .......................... 201710210784.4

(51) Int. Cl.
*H01R 13/52* (2006.01)
*G04G 17/06* (2006.01)
(Continued)

(52) U.S. Cl.
CPC ......... *H01R 13/5219* (2013.01); *G04G 17/06* (2013.01); *H01R 12/77* (2013.01);
(Continued)

(58) Field of Classification Search
CPC .......................... H01R 13/5219; H01R 12/77; H01R 13/5202; H01R 13/52; H01R 12/592;
(Continued)

(56) References Cited

U.S. PATENT DOCUMENTS

| 4,194,355 A | 3/1980 | Nishida | |
|---|---|---|---|
| 8,808,026 B2 * | 8/2014 | Yamaguchi | ........ H01R 13/5202 439/559 |

(Continued)

FOREIGN PATENT DOCUMENTS

| CN | 104427026 A | 3/2015 |
|---|---|---|
| CN | 104836016 A | 8/2015 |

(Continued)

*Primary Examiner* — Abdullah A Riyami
*Assistant Examiner* — Justin M Kratt
(74) *Attorney, Agent, or Firm* — Womble Bond Dickinson (US) LLP

(57) ABSTRACT

An electrical connection structure includes a body-end connection apparatus and a band-end connection apparatus. A first metal connection terminal included in the body-end connection apparatus is disposed on a first frame; a first sealing apparatus is configured to perform sealing between the first frame and the wearable device; a second frame included in the band-end connection apparatus is configured to connect to a band of the wearable device; and a second metal connection terminal is disposed on a frame and electrically connected to the band of the wearable device. When the band of the wearable device is connected to a body, the first metal connection terminal is electrically connected to the second metal connection terminal, the first frame clutches the second frame, and the second sealing apparatus is configured to perform sealing between the first frame and the second frame.

15 Claims, 5 Drawing Sheets

(51) Int. Cl.
*H01R 12/77* (2011.01)
*A41D 1/00* (2018.01)
*H01R 12/59* (2011.01)

(52) U.S. Cl.
CPC ......... *H01R 13/5202* (2013.01); *A41D 1/002* (2013.01); *A41D 1/005* (2013.01); *H01R 12/592* (2013.01); *H01R 13/52* (2013.01)

(58) Field of Classification Search
CPC .......... G04G 17/06; G06F 1/16; A41D 1/002; A41D 1/005
USPC ........................... 439/37, 271, 587, 272, 283
See application file for complete search history.

(56) References Cited

U.S. PATENT DOCUMENTS

| | | | |
|---|---|---|---|
| 2013/0206445 A1* | 8/2013 | Miura | H01R 13/5205 174/50.64 |
| 2014/0262847 A1 | 9/2014 | Yang | |
| 2016/0363957 A1* | 12/2016 | Stroetmann | G06F 1/189 |
| 2017/0069994 A1* | 3/2017 | Wagman | H01R 13/40 |
| 2017/0250554 A1* | 8/2017 | Tajima | G04G 19/00 |
| 2018/0210491 A1* | 7/2018 | Song | G06F 1/1656 |

FOREIGN PATENT DOCUMENTS

| | | |
|---|---|---|
| CN | 105093917 A | 11/2015 |
| CN | 205334075 U | 6/2016 |
| CN | 205485343 U | 8/2016 |
| EP | 2894761 A1 | 7/2015 |
| JP | 2002165618 A | 6/2002 |

\* cited by examiner

Insert

Complete an electrical connection

ELECTRICAL CONNECTION STRUCTURE AND WEARABLE DEVICE

CROSS-REFERENCE TO RELATED APPLICATIONS

This application is a national stage of International Application No. PCT/CN2017/090093, filed on Jun. 26, 2017, which claims priority to Chinese Patent Application No. 201710210784.4, filed on Mar. 31, 2017. Both of the aforementioned applications are hereby incorporated by reference in their entireties.

TECHNICAL FIELD

Embodiments of the application relate to intelligent terminal technologies, and in particular, to an electrical connection structure and a wearable device.

BACKGROUND

Popularity of wearable devices such as a smartwatch and a smart wristband leads to development of more related applications. Using a smartwatch as an example, applications include attaching a near field communication (NFC) function into a watch clasp, or embedding a battery into a watch band, and in this case the watch band needs to be electrically connected to a watchcase.

A frequently-used mode in which the watch band is connected to the watchcase is: Four probes protrude out of the watch band, and the four probes are connected to four in-mold injection molded terminals disposed on the watchcase. From right under the watchcase, terminals of the watch band are physically and electrically connected to the watchcase. Another mode in which the watch band is electrically connected to the watchcase is: Six metal terminals disposed on the watchcase are connected to a watch band end, and the watch band in a form of a special structure sideslips into a nesting structure disposed on the watchcase and gets clutched to implement electrical and physical connections.

However, a wearable device often comes into contact with water when being used, junctions in the two connection modes described above are all not waterproof, and non-waterproof construction leaves internal components vulnerable to damage.

SUMMARY

Embodiments of the application provide an electrical connection structure and a wearable device, to resolve a problem that a wearable device often comes into contact with water when being used, junctions in the two connection modes described above are all not waterproof, and non-waterproof construction leaves internal components vulnerable to damage.

In at least some embodiments, an electrical connection structure includes a body-end connection apparatus and a band-end connection apparatus of a wearable device, where the body-end connection apparatus includes a first frame, a first metal connection terminal, and a first sealing apparatus; the first metal connection terminal is disposed on the first frame and is configured to electrically connect to a main board of the wearable device; and the first sealing apparatus is configured to perform sealing between the first frame and a body of the wearable device; the band-end connection apparatus includes a second frame, a second metal connection terminal, and a second sealing apparatus; and the second frame is configured to connect to a band of the wearable device, and the second metal connection terminal is disposed on the second frame and is electrically connected to the band of the wearable device; and when the band is connected to the body of the wearable device, the first metal connection terminal is electrically connected to the second metal connection terminal, the first frame clutches the second frame, and the second sealing apparatus is configured to perform sealing between the first frame and the second frame.

The electrical connection structure may be applied to smart wearable devices such as a smartwatch and a smart band, but is not limited thereto; or may be applied to another product that is fastened by using a spring bar structure and that leaves an opening for disposing the electrical connection structure in the middle of the spring bar structure.

Sealing between the body of the wearable device and the band is performed by using the first sealing apparatus and the second sealing apparatus. When being used, a device to which this electrical connection structure is applied can be effectively waterproof and protect an internal component from damage.

In at least some embodiments, the body-end connection apparatus further includes a connecting flexible board, the first metal connection terminal is electrically connected to the main board of the wearable device by using the connecting flexible board, and the first sealing apparatus is sleeved around the connecting flexible board.

In at least some embodiments, the first sealing apparatus is a waterproof double-sided adhesive washer, and the second sealing apparatus is a waterproof adhesive washer.

In at least some embodiments, the band-end connection apparatus further includes a flexible board, where the second metal connection terminal is electrically connected to the band of the wearable device by using the flexible board.

In at least some embodiments, a material of the first frame and the second frame is resin.

In at least some embodiments a wearable device includes a body of the wearable device, a band, and an electrical connection structure, where the electrical connection structure includes a body-end connection apparatus and a band-end connection apparatus; the body-end connection apparatus includes a first frame, a first metal connection terminal, and a first sealing apparatus; and the first metal connection terminal is disposed on the first frame, the first metal connection terminal is electrically connected to a main board of the body of the wearable device, and the first sealing apparatus is disposed between the first frame and the body to perform sealing between the first frame and the body of the wearable device;
the band-end connection apparatus includes a second frame, a second metal connection terminal, and a second sealing apparatus; and the second frame is connected to the band, and the second metal connection terminal is disposed on the second frame and is electrically connected to the band; and the first metal connection terminal is electrically connected to the second metal connection terminal, the first frame clutches the second frame, and the second sealing apparatus performs sealing between the first frame and the second frame.

In at least some embodiments, the body-end connection apparatus further includes a connecting flexible board, and the first metal connection terminal is electrically connected to the main board of the wearable device by using the connecting flexible board.

In at least some embodiments, the first sealing apparatus is a waterproof double-sided adhesive washer, and the second sealing apparatus is a waterproof adhesive washer.

In at least some embodiments, a material of the first frame and the second frame is resin.

In at least some embodiments, the body further includes a body housing that is a housing structure of the body of the wearable device; and one end of the first metal connection terminal is soldered to the main board, and the main board is disposed inside the body housing; and the first metal connection terminal protrudes out of a connection hole provided on a watchcase side.

In at least some embodiments, the band includes a main band, a second upper protective cover, a second lower protective cover, and a battery; and the second upper protective cover and the second lower protective cover constitute a band body, the band body is disposed in a pre-formed position on the main band, the second metal connection terminal is connected to the battery and then disposed in the band body, and the second metal connection terminal is electrically connected to the first metal connection terminal.

In at least some embodiments, the band further includes a flexible board; and one end of the flexible board is connected to the battery, and the other end of the flexible board is connected to the second metal connection terminal.

In at least some embodiments, the wearable device is fastened to the band by using a spring bar structure.

In the electrical connection structure and the wearable device provided in an embodiment of the application, the body-end connection apparatus of the wearable device includes the first frame, the first metal connection terminal, and the first sealing apparatus. The first metal connection terminal is disposed on the first frame and is electrically connected to the main board of the body of the wearable device, and the first sealing apparatus is disposed between the first frame and the body of the wearable device to perform sealing between the first frame and the body of the wearable device. The band-end connection apparatus includes the second frame, the second metal connection terminal, and the second sealing apparatus. The second frame is connected to the band, the second metal connection terminal is disposed on the second frame and electrically connected to the band, the first metal connection terminal is electrically connected to the second metal connection terminal, the first frame clutches the second frame, and the second sealing apparatus performs sealing between the first frame and the second frame. This waterproof electrical connection structure may be used between the body of the wearable device and the band, to prevent a fault from occurring in an electronic component inside the band and the body due to immersion in liquid.

DESCRIPTION OF EMBODIMENTS

For problems of the foregoing wearable device, for example, the band is connected to the body by using sideslip construction, such a structure is excessively special, this type of band can only be applied to a same type of watchcase, but cannot be universally applied to other types of watches, and this connection mode is not waterproof, the application provides a universally applicable waterproof electrical connection structure for a body and a band of a wearable device, and the wearable device. When this electrical connection structure is used, any electronic component, such as a battery, or a near field communication (NFC) antenna with an electronic payment function, may be disposed inside the band. In addition, an electronic signal can be transmitted to the body of the wearable device, such as a watchcase of a watch, by using the electrical connection structure. Distinct characteristics of the electrical connection structure are: An electronic signal in the band can be stably transmitted to the body of the wearable device, IPX7 waterproof specifications can be met, and the electrical connection structure uses a spring bar structure and can be applicable to connections between bands and the bodies of more types of smart wearable devices. The following describes technical solutions of the application in detail in several embodiments.

Figure 1:
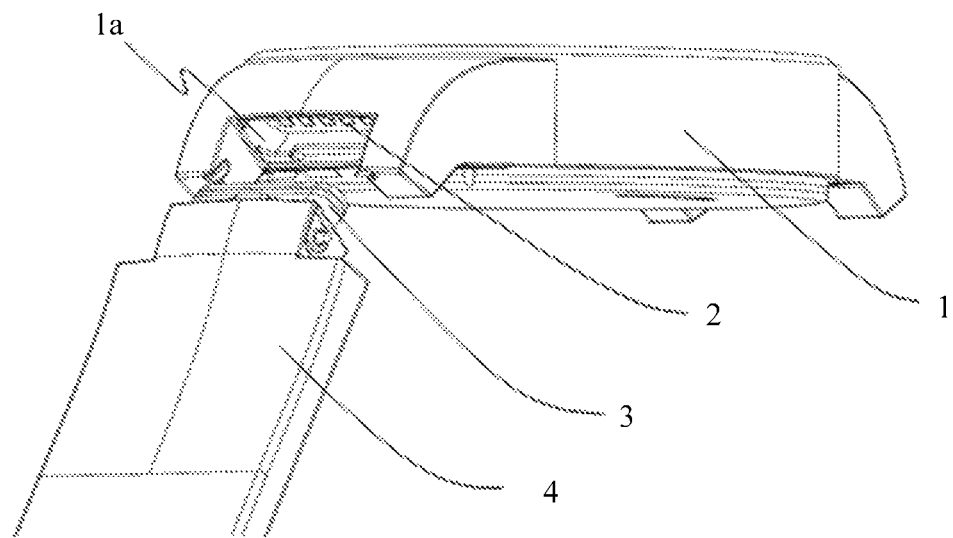
FIG. 1 is a schematic diagram of a wearable device according to an embodiment of the application.

FIG. 1 is a schematic diagram of a wearable device according to an embodiment of the application. The wearable device includes two parts: a band 4 and a body 1, and the band 4 is connected to the body 1 by using an electrical connection structure. As shown in FIG. 1, a connection hole is provided on inner sides of a left spring bar and a right spring bar of the body 1. The electrical connection structure includes an electrical connection apparatus 2 (e.g., a body-end connection apparatus 2) in the body 1, and an electrical connection apparatus 3 (e.g., a band-end connection apparatus 3) at a band end. After the band is fully mounted onto the body of the wearable device, the band-end connection apparatus of the band is connected to the body-end connection apparatus, so that an electronic or electrical signal of the band can be transmitted to the body of the wearable device.

Figure 2:
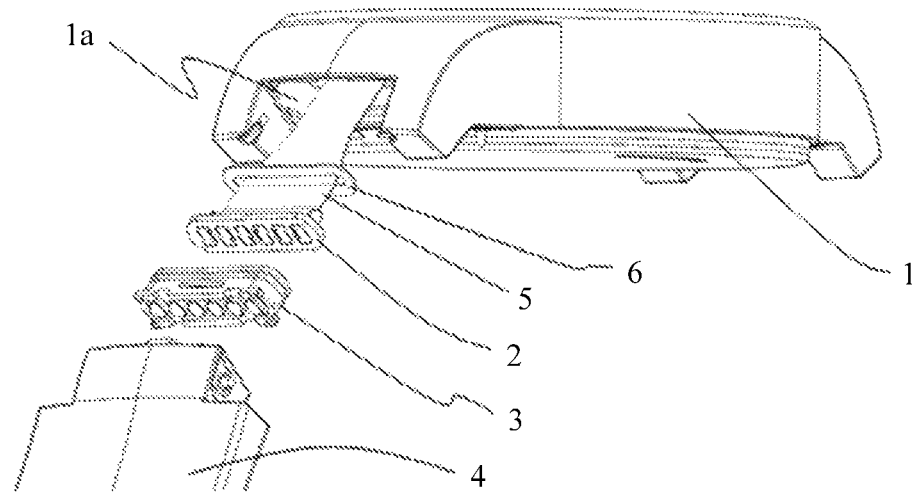
FIG. 2 is an exploded view of an electrical connection structure according to an embodiment of the application.
Figure 3:
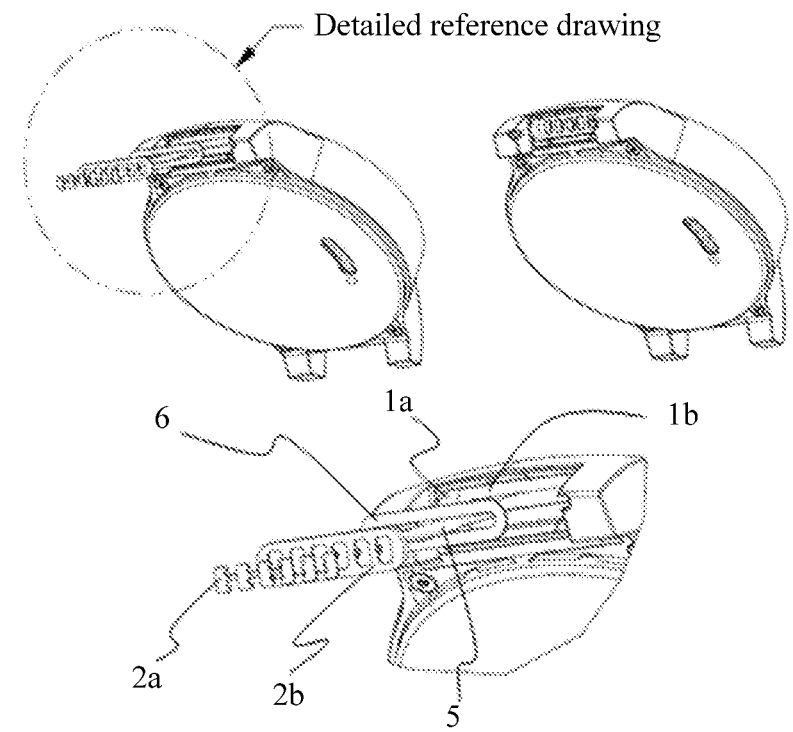
FIG. 3 is an exploded view of an electrical connection structure at a body end of a wearable device according to an embodiment of the application.
Figure 4:
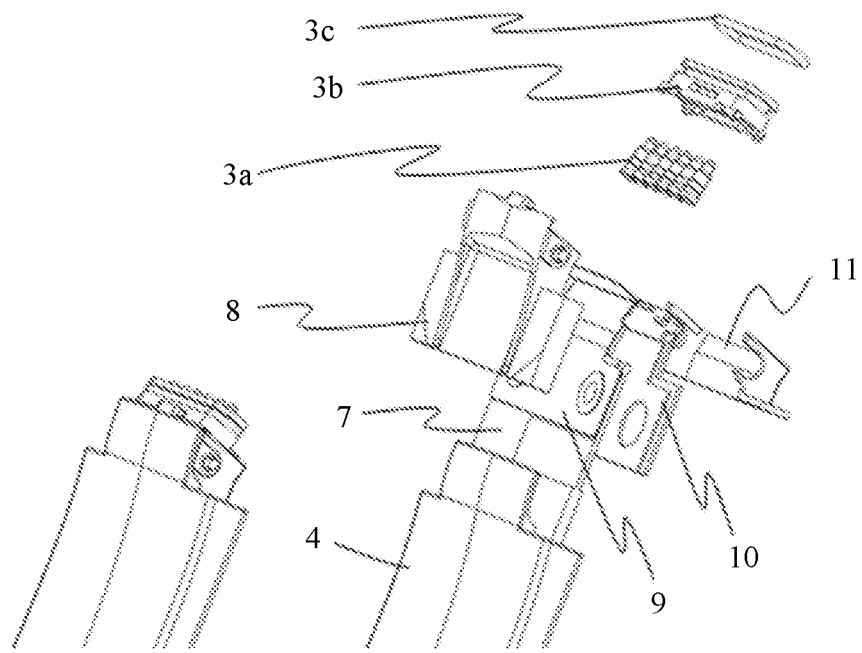
FIG. 4 is an exploded view of an electrical connection structure at a band end of a wearable device according to an embodiment of the application.
Figure 5:
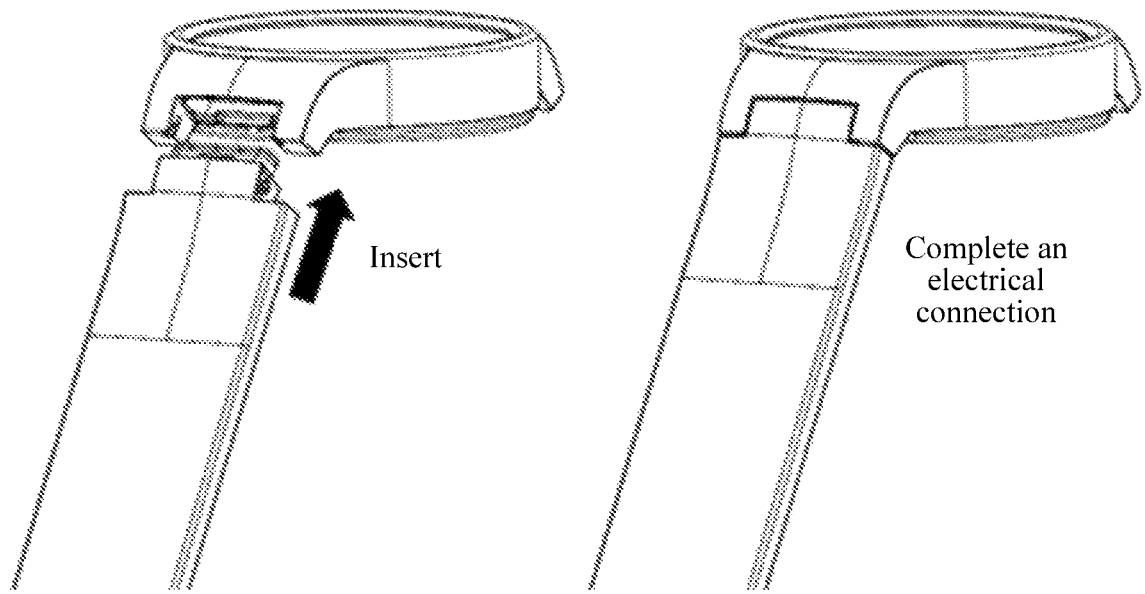
FIG. 5 is a schematic connection diagram of an electrical connection structure according to an embodiment of the application.
Figure 6:
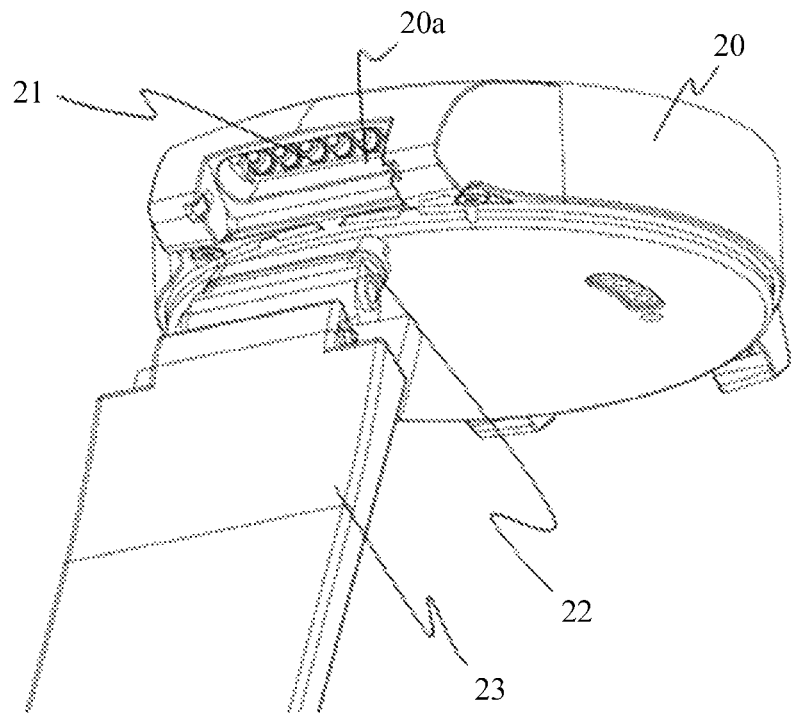
FIG. 6 is a schematic diagram of an electrical connection structure according to another embodiment of the application.
Figure 7:
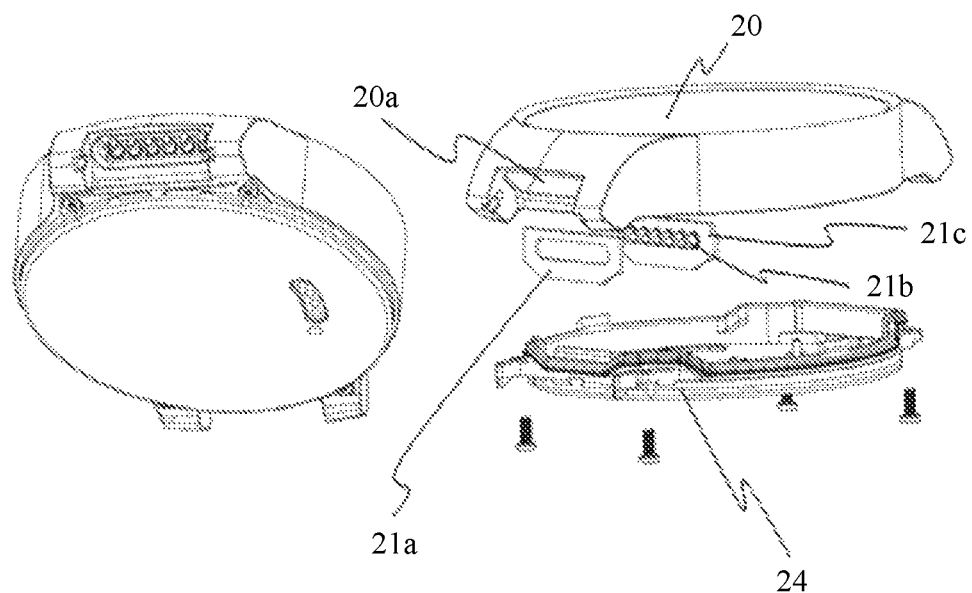
FIG. 7 is an exploded view of an electrical connection structure at a body end of a wearable device according to another embodiment of the application.
Figure 8:
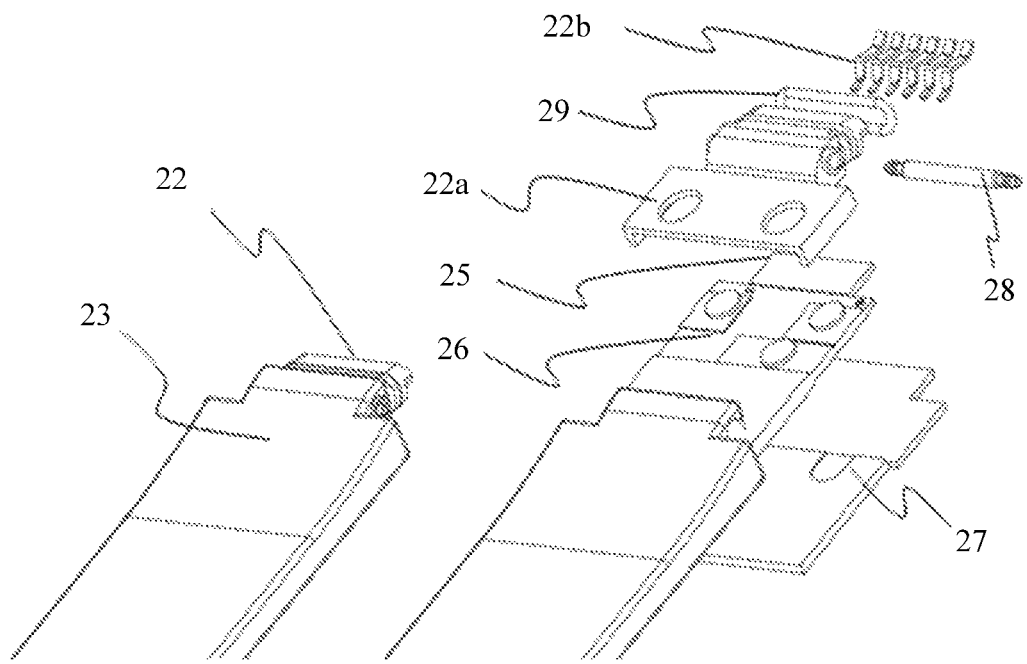
FIG. 8 is an exploded view of an electrical connection structure at a band end of a wearable device according to another embodiment of the application.
Figure 9:
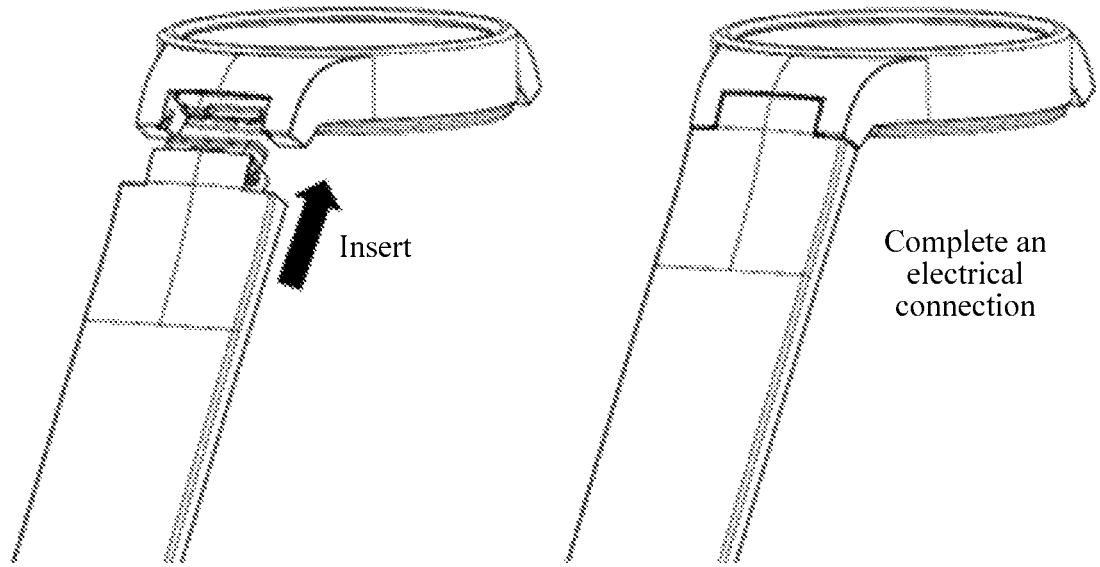
FIG. 9 is a schematic connection diagram of an electrical connection structure according to another embodiment of the application.

FIG. 2 is an exploded view of an electrical connection structure according to an embodiment of the application. FIG. 3 is an exploded view of an electrical connection structure at a body end of a wearable device according to an embodiment of the application. FIG. 4 is an exploded view of an electrical connection structure at a band end of a wearable device according to an embodiment of the application. FIG. 5 is a schematic connection diagram of an electrical connection structure according to an embodiment of the application. FIG. 6 is a schematic diagram of an electrical connection structure according to an embodiment of the application. FIG. 7 is an exploded view of an electrical connection structure at a body end of a wearable device according to an embodiment of the application. FIG. 8 is an exploded view of an electrical connection structure at a band end of a wearable device according to an embodiment of the application. FIG. 9 is a schematic connection diagram of Embodiment 2 of an electrical connection structure according to an embodiment of the application.

As shown in FIG. 2 to FIG. 9, the electrical connection structure includes a body-end connection apparatus 2 and a band-end connection apparatus 3.

The body-end connection apparatus includes a first frame 2b, a first metal connection terminal 2a, and a first sealing apparatus 6; and the first metal connection terminal 2a is disposed on the first frame 2b, the first metal connection terminal 2a is electrically connected to a main board of the body 1 of the wearable device, and the first sealing apparatus 6 is disposed between the first frame 2b and the body 1 to perform sealing between the first frame 2b and the body 1 of the wearable device.

The band-end connection apparatus 4 includes a second frame 3b, a second metal connection terminal 3a, and a second sealing apparatus 3c; and the second frame 3b is connected to the band, and the second metal connection terminal 3a is disposed on the second frame 3b and is electrically connected to the band.

The first metal connection terminal 2a is electrically connected to the second metal connection terminal 3a, the first frame 2b clutches the second frame 3b, and the second sealing apparatus 3c performs sealing between the first frame 2b and the second frame 3b.

Optionally, in a possible implementation, the body-end connection apparatus 1 further includes a connecting flexible board 5, and the first metal connection terminal 2a is electrically connected to the main board of the wearable device by using the connecting flexible board 5. That is, in this solution, the first metal connection terminal 2a may be directly soldered to the main board, or may be directly connected by using the connecting flexible board 5. This is not limited in the application.

Optionally, in another possible implementation, the first sealing apparatus 6 is a waterproof double-sided adhesive washer, and the second sealing apparatus 3c is a waterproof adhesive washer.

In an implementation of the wearable device or the electrical connection structure, a material of the first frame 2b and the second frame 3b is resin.

As shown in FIG. 3, the body of the wearable device further includes a body housing that is a housing structure of the body of the wearable device.

One end of the first metal connection terminal is soldered to the main board, and the main board is disposed inside the body housing; and the first metal connection terminal 2a protrudes out of a connection hole 1a provided on a body housing side. To connect to the first sealing device 6 to perform waterproof sealing on the wearable device, a body-end bonding surface 1b is further disposed at the connection hole 1a. In an assembly process, the first sealing apparatus 6 is bonded to the body-end bonding surface 1b to seal the body.

As shown in FIG. 4, the band includes a main band 4, an upper protective cover 8, a lower protective cover 10, and a battery 7. The upper protective cover 8 and the lower protective cover 10 constitute a band body, the band body is disposed in a pre-formed position on the main band 4, the second metal connection terminal 3a is connected to the battery 7 and then disposed in the band body, and the second metal connection terminal 3a is electrically connected to the first metal connection terminal 2a. This means that the second metal connection terminal 3a protrudes out of a side inside the band body and is then electrically connected to the first metal connection terminal 2a of the body of the wearable device.

In at least some embodiments, the band further includes a flexible board 9; and one end of the flexible board 9 is connected to the battery 7, and the other end of the flexible board 9 is connected to the second metal connection terminal 3a. Likewise, the second metal connection terminal 3a may be directly connected to the battery 7, or may be connected to the battery 7 by using the flexible board 9. This is not limited in the application.

In the wearable device or electrical connection structure provided in the foregoing solution, the band and the body are sealed by using a plurality of sealing structures, and a junction between the band and the body of the wearable device is sealed, thereby effectively preventing liquid from entering the junction and preventing damage to an internal electronic component.

With reference to the foregoing embodiment, using a smartwatch as an example, an electrical connection structure provided in the application is described in detail.

As shown in FIG. 2, the smartwatch includes a watchcase 1 (e.g., the body of the wearable device), a watchcase connection hole 1a, a watchcase-end connection apparatus 2, a band-end connection apparatus 3, a band 4, and a flexible board 5 of the watchcase connection apparatus. The watchcase-end connection apparatus 2 is attached to a waterproof double-sided adhesive 6 used by the watchcase.

A detailed exploded view of a watchcase end is shown in FIG. 3 in which the upper left is an exploded view of components, and the upper right is a completed assembly view. The lower part is a detailed exploded view, including a bonding surface 1b of the watchcase end, a first metal connection terminal 2a that is not limited in quantity on the watchcase connection apparatus 2, a connection apparatus resin frame 2b (e.g., the first frame), a connecting flexible board 5, and a waterproof double-sided adhesive 6 (e.g., the first sealing apparatus). The first metal connection terminal 2a is coated in the resin frame 2b through injection molding, or is coated therein through sealant pouring after assembly. The connecting flexible board 5 is assembled into the watchcase end after being connected to the watchcase connection apparatus 2.

A detailed exploded view of the band end is shown in FIG. 4. The left part of the view shows a completed assembly state, and the right part of the view shows a disassembled state. Inside the band end, an upper protective cover 8, a lower protective cover 10, a battery 7, a flexible board 9, a main band 4, and a lower band 11 are included, and in addition, a band-end connection apparatus is further included. In the view, the band-end connection apparatus is disassembled into three parts: a second connection metal terminal 3a, a resin frame 3b (e.g., the second frame), and a waterproof adhesive washer 3c (e.g., the second sealing apparatus).

A manner in which the band in FIG. 4 is assembled is as follows. First, the second connection metal terminal 3a is bonded to the resin frame 3b through injection molding or through sealant pouring around the terminal after press-in, then the flexible board 9 is welded, subsequently the internal battery 7 is connected, subsequently the upper protective cover 8 and the lower protective cover 10 are attached, then the pre-formed band 4 is placed in, subsequently the lower band 11 is formed, and finally the waterproof adhesive washer 3c is sleeved on the front of the electrical connection apparatus.

Then, the watchcase and the band are assembled to complete the assembly of the smartwatch. After the watchcase and the band are separately assembled in full, as shown in FIG. 5, the band is inserted into the watchcase to implement an electrical connection function and a waterproof feature.

FIG. 6 is a schematic diagram of an electrical connection structure according to another embodiment of the application. As shown in FIG. 6, the smartwatch includes a watchcase 20, a watchcase connection hole 20a, a watchcase-end connection apparatus 21, a band-end connection apparatus 22, and a band 23.

A detailed exploded view of a watchcase end of the smartwatch according to another embodiment is shown in FIG. 7. The upper left is a completed assembly view, and the right part is a detailed exploded view that shows a waterproof adhesive 21a adhered to an inner side of a watchcase on the watchcase connection apparatus 21, a first metal connection terminal 21b that is not limited in quantity, and a connection apparatus main board 21c. The first metal connection terminal 21b is soldered onto the main board 21c by using a surface mount adhesive (SMT) or in another manner, and then assembled on the inner side of the watchcase, so that the first metal connection terminal 21b protrudes at the watchcase connection hole 20a. The lower cover 24 is attached after completion of assembly.

A detailed exploded view of a band end of the smartwatch according to another embodiment is shown in FIG. 8. The left part of the view shows a completed assembly state, and the right part shows a disassembled state. Inside the band end, an upper protective cover 22a, an electrical connection apparatus, a second metal connection terminal 22b, a lower protective cover 27, a battery 26, a main board 25, a spring bar 28, and a waterproof adhesive washer 29 are included.

A manner in which the band in FIG. 8 is assembled is as follows. First, the second connection metal terminal 22b is bonded to the resin upper protection cover 22a through injection molding or through sealant pouring around the terminal after press-in, then the main board 25 is welded, subsequently the internal battery 26 is connected, then the pre-formed band 23 is placed in, subsequently the lower protective cover 27 is attached, subsequently the spring bar 28 is placed in, and finally the waterproof adhesive washer 29 is sleeved on the front of the electrical connection apparatus.

After the watchcase and the band are separately assembled in full, as shown in FIG. 9, the band is inserted into the watchcase to implement an electrical connection function and a waterproof feature.

In any one of the foregoing embodiments, the first metal connection terminal or the second metal connection terminal of the body end and the band end includes a metal terminal of any shape, and any metal that can transmit an electrical signal may be applied to this solution.

The foregoing describes the electrical connection structure by using a smartwatch as an example. Actually, the electrical connection structure may be applied to any smart wearable product, including but not limited to a watch, or may be applied to any product that is fastened by using a spring bar structure and that leaves an opening for disposing the electrical connection apparatus in the middle of the spring bar structure.

The embodiments of the application provide an electrical connection structure used between the body and the band of the smart wearable product. The electrical connection structure mainly has the features as follows. The watchcase end is located in a mounting hole in the left and right spring bar structures, and is electrically connected to the main board of the watchcase in the mounting hole of the body; the band is electrically connected to the watchcase at the junction; the band is fastened to the watchcase by using the spring bar structure; and after the band is assembled onto the watchcase, IP57 waterproof specifications can be met. Likewise, the wearable device equipped with the electrical connection structure can be unlocked by using the electrical connection structure, an electronic signal of any electronic component inside the band can be transmitted into the watchcase, and a very good waterproof effect can be achieved.

Finally, it should be noted that the foregoing embodiments are merely intended for describing the technical solutions of the application, rather than limiting the application.

What is claimed is:

1. An electrical connection structure, comprising:
a body-end connection apparatus, wherein the body-end connection apparatus comprises a first frame, a first metal connection terminal, a connecting flexible board, and a first sealing apparatus; wherein the first metal connection terminal is disposed on the first frame and is configured to electrically connect to a main board of a wearable device by using the connecting flexible board, wherein the first sealing apparatus is sleeved around the connecting flexible board; and wherein the first sealing apparatus is configured to perform sealing between the first frame and a body of the wearable device; and
a band-end connection apparatus of the wearable device, wherein the band-end connection apparatus comprises a second frame, a second metal connection terminal, and a second sealing apparatus; wherein the second frame is configured to connect to a band of the wearable device, and wherein the second metal connection terminal is disposed on the second frame and is electrically connected to the band, including a battery, of the wearable device; and
wherein when the band is connected to the body of the wearable device, the first metal connection terminal is electrically connected to the second metal connection terminal, the first frame clutches the second frame, and the second sealing apparatus is configured to perform sealing between the first frame and the second frame.

2. The electrical connection structure according to claim 1, wherein the first sealing apparatus is a waterproof double-sided adhesive washer, and wherein the second sealing apparatus is a waterproof adhesive washer.

3. The electrical connection structure according to claim 1, wherein the band-end connection apparatus further comprises:
a flexible board, wherein the second metal connection terminal is electrically connected to the band of the wearable device by using the flexible board.

4. The electrical connection structure according to claim 1, wherein a material of the first frame and the second frame is resin.

5. The electrical connection structure according to claim 1, wherein the first metal connection terminal is coated in a first frame injection molding, or is coated in the first frame through sealant pouring after assembly.

6. The electrical connection structure according to claim 1, wherein, the second connection metal terminal is bonded to the second frame through injection molding or through sealant pouring around the terminal after press-in the second frame.

7. A wearable device, comprising:
a body;
a band; and
an electrical connection structure, wherein the electrical connection structure comprises a body-end connection apparatus and a band-end connection apparatus;
wherein the body-end connection apparatus comprises a first frame, a first metal connection terminal, a connecting flexible board, and a first sealing apparatus; wherein the first metal connection terminal is disposed on the first frame, wherein the first metal connection terminal is electrically connected to a main board of the body of the wearable device by using the connecting flexible board, wherein the first sealing apparatus is sleeved around the connecting flexible board, and wherein the first sealing apparatus is disposed between the first frame and the body to perform sealing between the first frame and the body of the wearable device;
wherein the band-end connection apparatus comprises a second frame, a second metal connection terminal, and a second sealing apparatus; and wherein the second frame is connected to the band, and wherein the second metal connection terminal is disposed on the second frame and is electrically connected to the band including a battery; and
wherein the first metal connection terminal is electrically connected to the second metal connection terminal, wherein the first frame clutches the second frame, and wherein the second sealing apparatus performs sealing between the first frame and the second frame.

8. The wearable device according to claim 7, wherein the first sealing apparatus is a waterproof double-sided adhesive washer, and wherein the second sealing apparatus is a waterproof adhesive washer.

9. The wearable device according to claim 7, wherein a material of the first frame and the second frame is resin.

10. The wearable device according to claim 7, wherein the body further comprises a body housing that is a housing structure of the body of the wearable device; and
wherein one end of the first metal connection terminal is soldered to the main board, and the main board is disposed inside the body housing; and wherein the first metal connection terminal protrudes out of a connection hole provided on a watchcase side.

11. The wearable device according to claim 7, wherein the band comprises: a main band, a second upper protective cover, a second lower protective cover, and the battery; and
wherein the second upper protective cover and the second lower protective cover constitute a band body, wherein the band body is disposed in a pre-formed position on the main band, the second metal connection terminal is connected to the battery and then disposed in the band body, and wherein the second metal connection terminal is electrically connected to the first metal connection terminal.

12. The wearable device according to claim 7, wherein the band further comprises a flexible board; and wherein one end of the flexible board is connected to the battery, and the other end of the flexible board is connected to the second metal connection terminal.

13. The wearable device according to claim 7, wherein the wearable device is fastened to the band by using a spring bar structure.

14. The wearable device according to claim 7, wherein the first metal connection terminal is coated in the first frame injection molding, or is coated in the first frame through sealant pouring after assembly.

15. The wearable device according to claim 7, wherein the second connection metal terminal is bonded to the second frame through injection molding or through sealant pouring around the terminal after press-in the second frame.

* * * * *